US012768995B2

United States Patent

Avci et al.

(12) United States Patent
(10) Patent No.: US 12,768,995 B2
(45) Date of Patent: Oct. 20, 2026

(54) LIDAR WITH SEED MODULATED SEMICONDUCTOR OPTICAL AMPLIFIER FOR ENHANCED SIGNAL TO NOISE RATIO

(71) Applicant: AEVA, INC., Mountain View, CA (US)

(72) Inventors: Oguzhan Avci, San Francisco, CA (US); James Reuther, San Francisco, CA (US); Mina Rezk, Haymarket, VA (US)

(73) Assignee: AEVA, INC., Mountain View, CA (US)

( * ) Notice: Subject to any disclaimer, the term of this patent is extended or adjusted under 35 U.S.C. 154(b) by 735 days.

(21) Appl. No.: 18/196,347

(22) Filed: May 11, 2023

(65) Prior Publication Data

US 2024/0377534 A1 Nov. 14, 2024

(51) Int. Cl.
*G01S 17/58* (2006.01)
*G01S 7/481* (2006.01)
*G01S 7/4911* (2020.01)

(52) U.S. Cl.
CPC ............ *G01S 17/58* (2013.01); *G01S 7/4815* (2013.01); *G01S 7/4911* (2013.01)

(58) Field of Classification Search
CPC ...... G01S 7/4815; G01S 7/4911; G01S 17/34; G01S 17/58

(Continued)

(56) References Cited

U.S. PATENT DOCUMENTS 11,366,206 B2 * 6/2022 Behzadi ................ G01S 7/4918
11,789,156 B1 * 10/2023 Michaels .............. G01S 17/931 359/237

(Continued)

FOREIGN PATENT DOCUMENTS

WO WO-2017186850 A1 * 11/2017 ........... G01S 7/4815
WO WO-2021144357 A1 * 7/2021 ........... G01S 17/894

(Continued)

OTHER PUBLICATIONS

Zhang,et al., "Enhanced Velocity Measurement of Lidar by Optical Parametric Assisted Frequency Modulation," 2023 Asia Communications and Photonics Conference/2023 International Photonics and Optoelectronics Meetings (ACP/POEM), Wuhan, China, 2023 https://ieeexplore.ieee.org/document/10368623 (Year: 2023).*

(Continued)

*Primary Examiner* — Atul Trivedi

(74) *Attorney, Agent, or Firm* — Womble Bond Dickinson (US) LLP

(57) ABSTRACT

A light detection and ranging (LIDAR) system that includes optical sources configured to emit a first frequency modulated optical beam and a second frequency modulated optical beam. The system also includes an optical amplifier to receive the optical beams and generate output optical beams. The system also includes an optical arrangement to emit the output optical beams and collect light returned from the target in return beams. The system also includes an optical element to generate a first beat frequency from the first return beam and a second beat frequency from the second return beam. The system also includes a signal processing system to determine the range and velocity of the target from the beat frequencies. The system also includes circuitry to control an amplitude of the first optical beam input to the optical amplifier to amplitude modulate the first output optical beam and the second output optical beam.

17 Claims, 8 Drawing Sheets

(58) Field of Classification Search
USPC .......................................................... 356/5.1
See application file for complete search history.

(56) References Cited

U.S. PATENT DOCUMENTS

| | | | | |
|---|---|---|---|---|
| 12,339,372 | B1 * | 6/2025 | Rogers | G01S 17/58 |
| 2018/0188355 | A1 * | 7/2018 | Bao | G01S 7/4812 |
| 2019/0107607 | A1 * | 4/2019 | Danziger | G01S 7/4817 |
| 2019/0129035 | A1 * | 5/2019 | Valouch | G01S 7/4815 |
| 2020/0256958 | A1 * | 8/2020 | Piggott | G01B 11/22 |
| 2021/0194206 | A1 * | 6/2021 | Raring | H01S 5/22 |
| 2021/0373172 | A1 * | 12/2021 | Solomentsev | G01S 7/493 |
| 2022/0113411 | A1 * | 4/2022 | Solomentsev | G01S 7/484 |
| 2022/0229183 | A1 * | 7/2022 | Chang | G01S 7/486 |
| 2023/0025747 | A1 * | 1/2023 | Cannon | G01S 7/4865 |
| 2023/0204730 | A1 * | 6/2023 | Yu | G01S 7/487 356/4.01 |
| 2023/0221438 | A1 * | 7/2023 | Hansen | G01S 7/4865 356/4.01 |
| 2024/0045034 | A1 * | 2/2024 | Galloway | G01S 7/4808 |
| 2024/0329203 | A1 * | 10/2024 | Braun | G01S 17/34 |
| 2024/0377534 | A1 * | 11/2024 | Avci | G01S 7/4815 |
| 2025/0116773 | A1 * | 4/2025 | Kadlec | G01S 17/04 |
| 2025/0271554 | A1 * | 8/2025 | Ignatescu | G01S 7/484 |
| 2025/0277895 | A1 * | 9/2025 | Michaels | G01S 17/06 |

FOREIGN PATENT DOCUMENTS

| | | | | |
|---|---|---|---|---|
| WO | WO-2021226630 | A1 * | 11/2021 | G01S 7/497 |
| WO | WO-2021231559 | A1 * | 11/2021 | G01S 17/89 |
| WO | WO-2021231903 | A1 * | 11/2021 | B60W 60/00 |
| WO | WO-2022035537 | A1 * | 2/2022 | G01S 7/4817 |
| WO | WO-2023129725 | A1 * | 7/2023 | G01S 7/4815 |
| WO | WO-2024142059 | A1 * | 7/2024 | G01S 7/4917 |
| WO | WO-2024142073 | A1 * | 7/2024 | G01S 17/42 |
| WO | WO-2024213207 | A1 * | 10/2024 | G02F 1/2955 |
| WO | WO-2024213208 | A1 * | 10/2024 | G01S 17/34 |
| WO | WO-2024213209 | A1 * | 10/2024 | G01S 17/931 |

OTHER PUBLICATIONS

Mullen, et al., "Application of RADAR technology to aerial LIDAR systems for enhancement of shallow underwater target detection," in IEEE Transactions on Microwave Theory and Techniques, vol. 43, No. 9, pp. 2370-2377, Sep. 1995, doi: 10.1109/22.414591 (https://ieeexplore.ieee.org/document/414591) (Year: 1995).*

Zhang, et al., "Enhanced Velocity Measurement of Lidar by Optical Parametric Assisted Frequency Modulation," 2023 Asia Communications and Photonics Conference/2023 International Photonics and Optoelectronics Meetings (ACP/POEM), Wuhan, China, 2023, pp. 1-4 https://ieeexplore.ieee.org/document/10368623 (Year: 2023).*

* cited by examiner

LIDAR WITH SEED MODULATED SEMICONDUCTOR OPTICAL AMPLIFIER FOR ENHANCED SIGNAL TO NOISE RATIO

FIELD OF INVENTION

The present disclosure is related to light detection and ranging (LIDAR) systems, and more particularly to systems and methods of providing a variety of LIDAR scan patterns.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates a beat frequency at the receiver that is proportional to the distance to each target in the field of view of the system.

A multi-wavelength FMCW lidar system provides simultaneous measurement of velocity and range by making use of nondegenerate laser sources, i.e. laser sources with different wavelengths. The light from lasers is combined and split into each beam and then amplified before they are delivered to the scene. The light scattered from the scene is then mixed with the local oscillator (LO) light on the photodiodes where the coherent signal is generated. The signal-to-noise ratio (SNR) in such a system depends on Transmit (Tx) power, target distance, overall light collection efficiency, and lag angle induced by a fast scanner. As the target distance increases, the SNR of such a system drops (number of collected photons drops due to decrease in solid angle in the radiometric equation), resulting in reduced probability of detection and reduced lidar performance.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for detecting distance and relative speed of objects. Embodiments of the present techniques improve SNR by enabling the use of amplitude modulation of the laser light upstream from the optical amplifiers. For example, the amplitude modulation can provide SNR enhancement up to 3 dB on a single wavelength receiver channel in a dual-wavelength nondegenerate FMCW system. In some embodiments, the LIDAR system alternates between single wavelength and dual wavelength operation every frame such that in one frame dual wavelength operation enables simultaneous range and velocity detection of objects and the single wavelength operation in the next frame enables detection of the objects with higher SNR and probability of detection. Furthermore, the doppler information from the previous frame can be used as a priori information to compensate for lack of velocity detection in the next frame. In some embodiments, a single frame can be partitioned into sub-groups that use a different type of laser amplitude modulation. This could allow one portion of the field of view (FOV) to have a signal from a single wavelength laser with higher amplitude while other portions of the field of view have a signal from multiple wavelength lasers.

In the following description, reference may be made herein to quantitative measures, values, relationships or the like. Unless otherwise stated, any one or more if not all of these may be absolute or approximate to account for acceptable variations that may occur, such as those due to engineering tolerances or the like.

Figure 1:
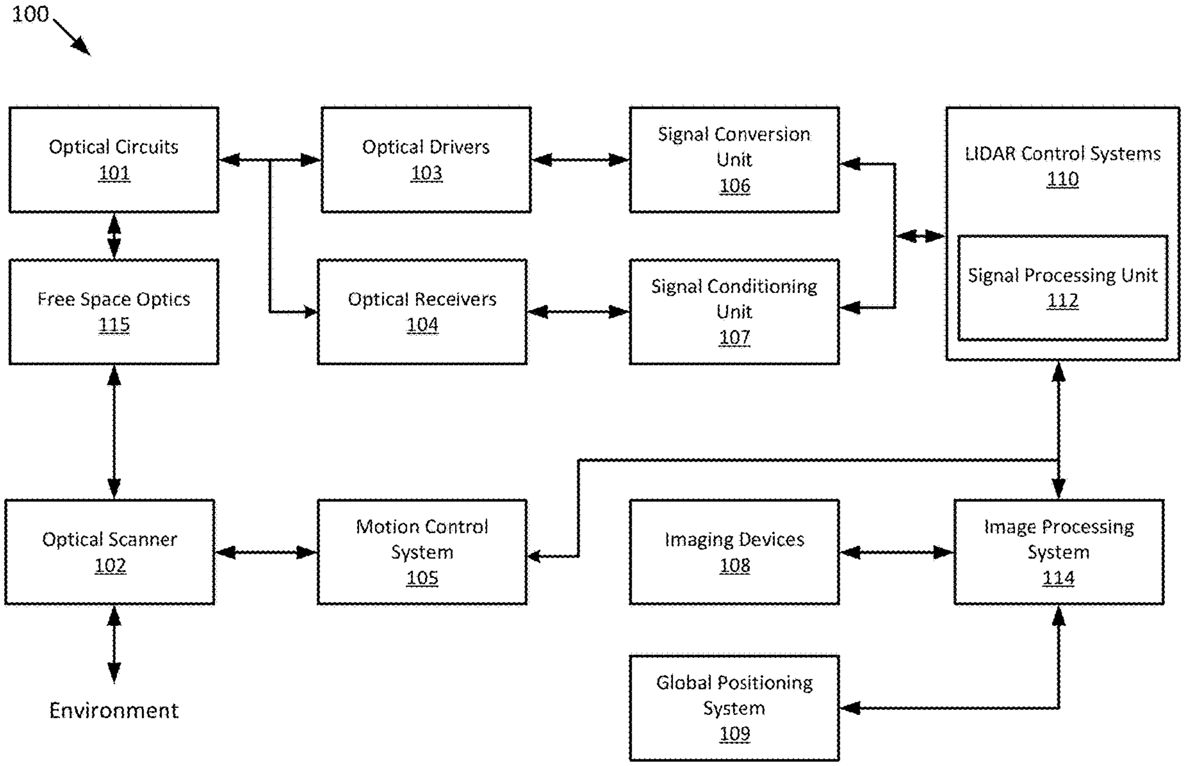
FIG. 1 is a block diagram of an example LIDAR system according to some embodiments of the present disclosure.

FIG. 1 is a block diagram of an example LIDAR system 100 according to some embodiments of the present disclosure. The LIDAR system 100 includes one or more of each of a number of components but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, attenuate, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scan pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

FIG. 2 is a time-frequency diagram of FMCW scanning signals that can be used by a LIDAR system according to some embodiments of the present disclosure. The FMCW scanning signals 200 and 202 may be used in any suitable LIDAR system, including the system 100, to scan a target environment. The FMCW scanning signal 200 may be a triangular waveform with an up-chirp and a down-chirp having a same bandwidth $\Delta f_s$ and period $T_s$. The other FMCW scanning signal 202 is also a triangular waveform that includes an up-chirp and a down-chirp with bandwidth $\Delta f_s$ and period $T_s$. However, the two signals are inverted versions of one another such that the up-chirp on FMCW scanning signal 200 occurs in unison with the down-chirp on FMCW scanning signal 202.

FIG. 2 also depicts example return signals 204 and 206. The return signals 204 and 206, are time-delayed versions of the FMCW scanning signals 200 and 202, where $\Delta t$ is the round trip time to and from a target illuminated by FMCW scanning signal 201. The round trip time is given as $$\Delta t = 2R/v,$$

where R is the target range and v is the velocity of the optical beam, which is the speed of light c. The target range, R, can therefore be calculated as $$R = c(\Delta t/2).$$

In embodiments, the time delay $\Delta t$ is not measured directly, but is inferred based on the frequency differences between the transmitted scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference between the transmitted scanning waveform and the return signal, which is linearly related to the time delay $\Delta t$ by the slope of the triangular waveform.

If the return signal has been reflected from an object in motion, the frequency of the return signal will also be affected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$. The beat frequencies $\Delta f_{up}$ and $\Delta f_{dn}$ are related to the frequency difference cause by the range, $\Delta f_{Range}$, and the frequency difference cause by the Doppler shift, $\Delta f_{Doppler}$, according to the following formulas:

$$\Delta f_{up} = \Delta f_{Range} - \Delta f_{Doppler} \quad (1)$$

$$\Delta f_{dn} = \Delta f_{Range} + \Delta f_{Doppler} \quad (2)$$

Thus, the beat frequencies $\Delta f_{up}$ and $\Delta f_{dn}$ can be used to differentiate between frequency shifts caused by the range and frequency shifts caused by motion of the measured object. Specifically, $\Delta f_{Doppler}$ is the difference between the $\Delta f_{up}$ and $\Delta f_{dn}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range}\frac{cT_s}{2\Delta f_s} \quad (3)$$

$$\text{Velocity} = \Delta f_{Doppler}\frac{\lambda_c}{2} \quad (4)$$

In the above formulas, $$\lambda_c = c/f_c$$

and $f_c$ is the center frequency of the scanning signal. By solving this system of equations for $\Delta f_{Range}$ and $\Delta f_{Doppler}$ and substituting those values into equations (3) and (4) respectively, one sees that the range and velocity, shown in equations (5) and (6), are proportional to the average and difference, respectively, of the up-sweep and down-sweep beat frequencies.

$$R = \frac{cT_s}{4B_s}(\Delta f_{dn} + \Delta f_{up}) \quad (5)$$

$$V = \frac{\lambda_c}{4}(\Delta f_{dn} - \Delta f_{up}) \quad (6)$$

Figure 2A:
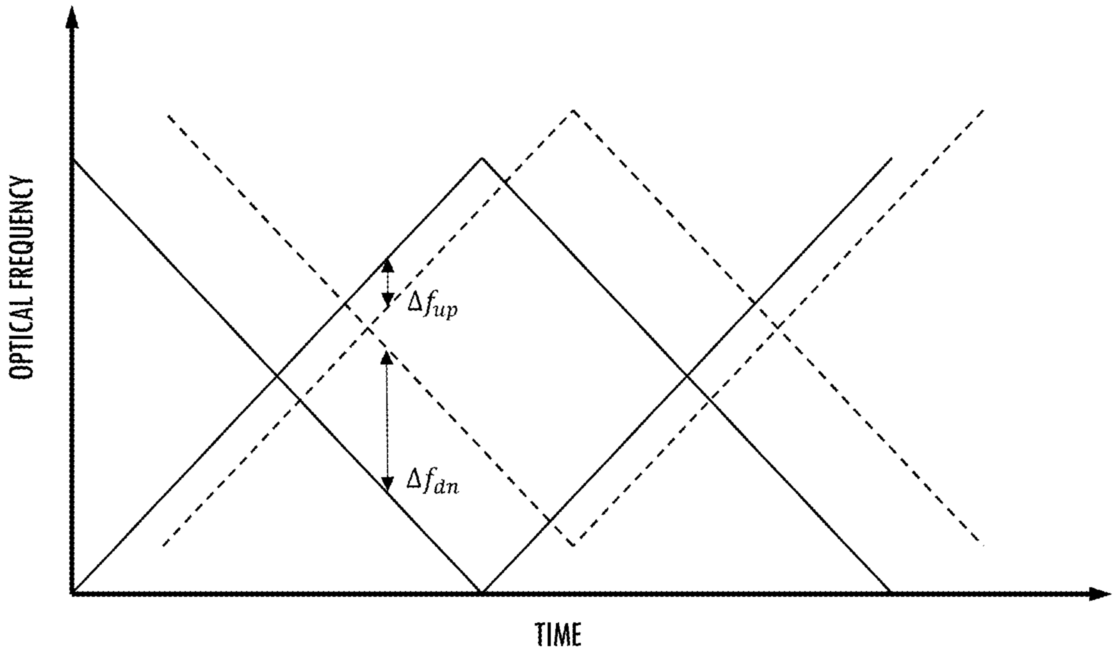
FIGS. 2A, 2B, and 2C are time-frequency diagrams of FMCW scanning signals that can be used by a LIDAR system according to some embodiments of the present disclosure.

By employing a counter-chirp mechanism shown in FIG. 2A one can achieve more accurate measurements for range and velocity since the up-sweep and down-sweep beat frequencies are measured simultaneously. This modulation scheme uses two transmitted beams (solid line and long-dashed line) pointed at the same target; each beam yields its respective echo (short-dashed line and dotted line). As a result, the system simultaneously measures both beat notes ($\Delta f_{up}$ and $\Delta f_{dn}$) from which it can calculate the range and velocity using equations (5) and (6). In embodiments wherein both optical beams have a same center frequency, the optical beams may have a different polarization to enable separation of the return beams for generating the different beat frequencies.

Figure 2B:
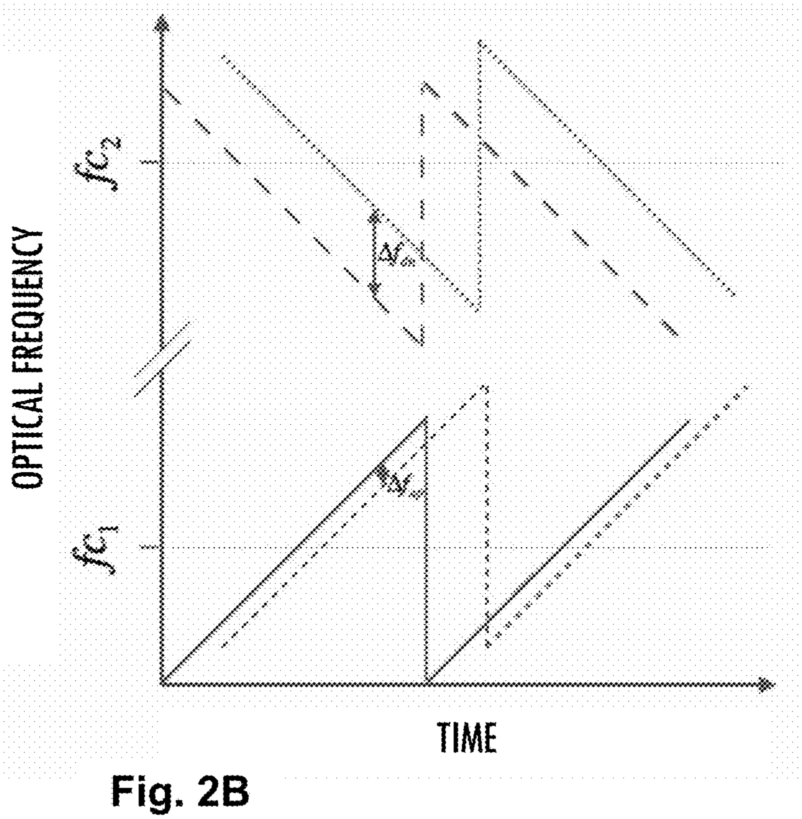
Figure 2C:
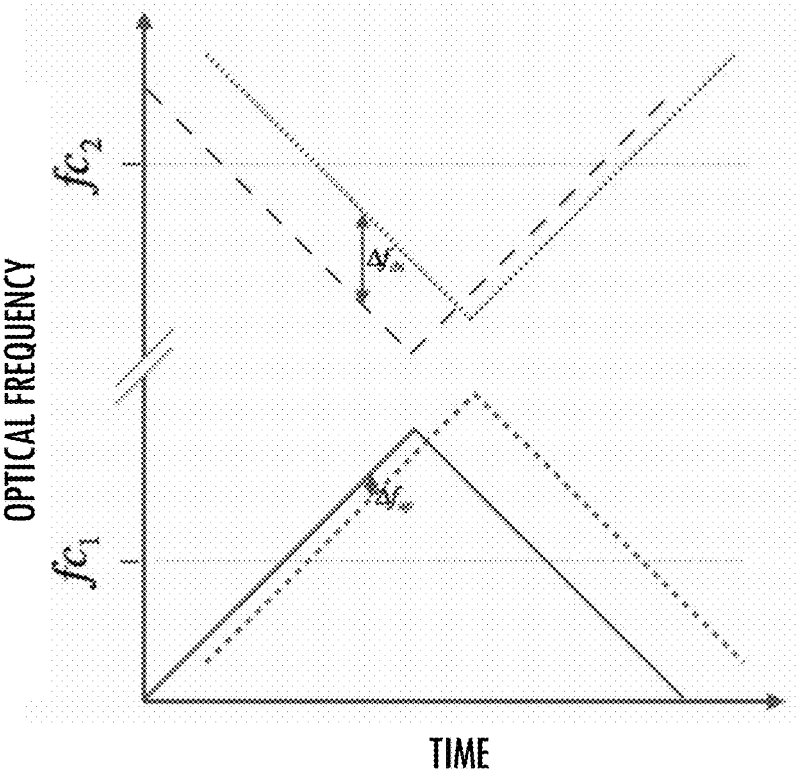

Another example modulation scheme according to the present disclosure is to have a counter chirp scheme but with a different center frequency as shown in FIGS. 2B and 2C. Having such scheme allows us to measure the reflectivity and/or absorption of different material surfaces. In FIGS. 2B and 2C, the values $\Delta f_{up}$ and $\Delta f_{dn}$ are obtained and the range and velocity computed according to equations (5) and (6) as described above. In the embodiments, shown in FIGS. 2B and 2C, each output optical beam may have a same polarization or different polarizations.

The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at a same moment in time, as shown in FIGS. 2A, 2B, and 2C. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. In order to measure both beat frequencies at the same time, the up-chirp and down-chirp can be synchronized and transmitted simultaneously using two signals that are multiplexed together.

Figure 3:
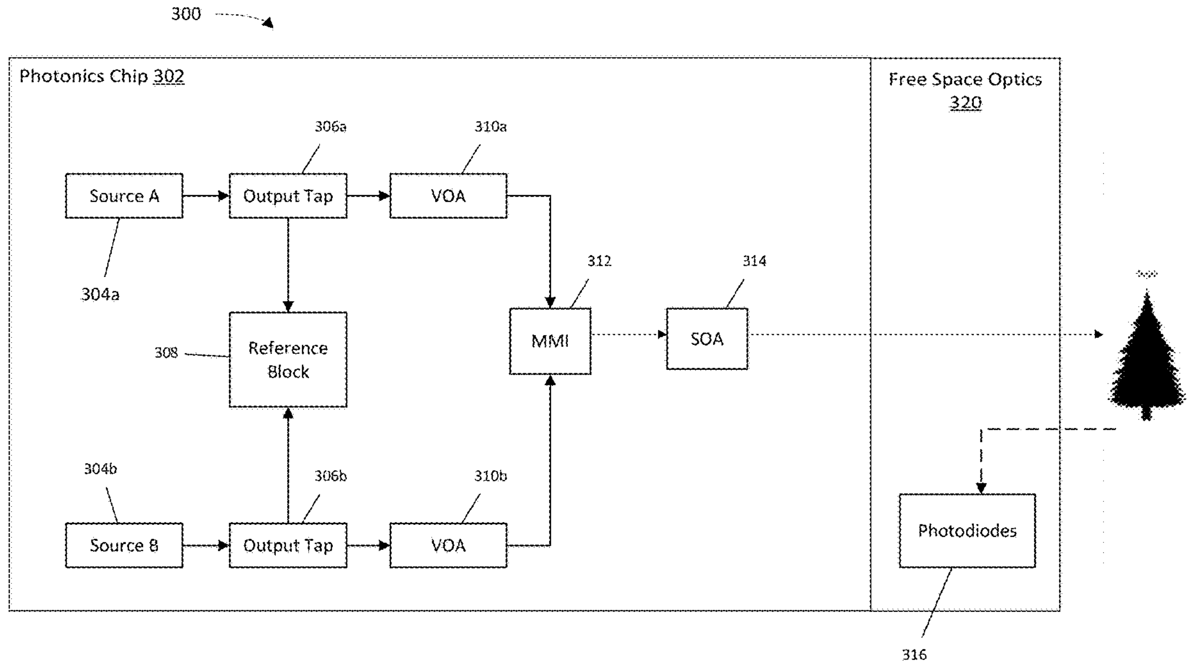
FIG. 3 is a block diagram of a FMCW LIDAR system in accordance with some embodiments of the present disclosure.

FIG. 3 is a block diagram of a FMCW LIDAR system in accordance with some embodiments of the present disclosure. In the embodiment shown in FIG. 3, the FMCW lidar system is implemented as an integrated module, which includes a photonics chip 302 and free space optics (FSO) 320. The photonics chip 302 generates the amplified FM modulated LIDAR light that is input into the free space optics 320. The photonics chip 302 can include two lasers (referred to herein as optical source A 304*a* and optical source B 304*b*), a reference block 308 (for linear FM modulation), variable optical attenuators (VOAs) 310*a* and 310*b*, and an optical amplifier 314. The photonics chip 302 may also include various waveguides, combiners, splitters, and the like. The photonics chip 302 may be a silicon photonics chip that uses silicon as an optical medium and can be made using semiconductor fabrication techniques.

In this embodiment, each optical source 304*a* and 304*b* outputs an optical beam which is frequency modulated to generate the up-chirp or the down chirp as described above. The center frequency of each optical beam may be the same as described in relation FIG. 2A or may be different as described in relation FIGS. 2B and 3C. The optical beams output by the optical sources 304*a* and 304*b* may be referred to as a transmitted, or incident beam, while the beam reflected from the target may be referred to herein as the received, or return beam.

The output of the optical source 304*a* and 304*b* is provided to an output tap 306, which is be configured to split a small portion of the optical beam energy to the reference block 308. The reference block 308 is configured to control the frequency modulation of the optical sources 304*a* and 304*b* by ensuring that the frequency modulation is linear or close to linear as shown in FIGS. 2A, 2B, and 2C. The reference block 308 forms a feedback loop and generates output control signals that can increase or decrease the frequency of each optical source to maintain linearity.

The remainder of each optical beam passes through a variable optical attenuators (VOAs) 310*a* and 310*b*. The VOA is a tunable component that enables the LIDAR control system 110 to control the amplitude of each optical beam. For example, the VOA 310*a* and 310*b* may be liquid crystal attenuator. The VOAs 310*a* and 310*b* may be capable of reducing the amplitude of its respective optical beam to zero or near zero. Additionally, the VOAs 310*a* and 310*b* may have a continuous range of states or may be adjustable in a set of discrete states. For example, the variable optical attenuators may operate like a switch that can be set to on (light passing though) or off (light blocked).

Any light passing through the VOAs 310*a* and 310*b* is input to a multi-mode interferometer (MMI) 312 that is configured to combine the two optical beams (A and B) into a combined optical beam (A+B). The output of the MMI 312 is input to the semiconductor optical amplifier (SOA) 314. The input to the SOA 314 will be a combination of the optical beams from optical source A 304*a* and optical source B 304*b* less whatever portion of each signal has been attenuated by the respective VOAs 310*a* and 310*b*. This combined optical beam is amplified by the SOA 314 and output to the free space optics 320. The optical beam output by the SOA 314 may be referred to herein as an output optical beam.

Upon exiting the photonics chip 302, the output optical beams enter the free space optics 320, which responsible for routing the amplified light to the scene and receive the scattered light back to generate the coherent lidar signal. The optical beam may pass through various components such as polarization beam splitters (PBS), lenses to collimate the optical beam prior, components to transform the polarization of the light, and others. Additionally, a local oscillator (not shown) can be generated inside the free space optics 320 and combined with the return signal reflected from the target by coating one of the surfaces with a partial reflective coating.

Additionally, the transmitted optical beams may be transmitted towards the target by an optical scanner that generates the two-dimensional field of view (FOV). When the optical beam hits the target, a portion of the beam is returned back to the LIDAR system 300 as a return signal. The return signal is received by the free space optics 320 where the return signal is combined with the local oscillator signal and redirected to the photodiodes 316. The combined signal can then be used to measure distance, velocity, or other factors about the environment at the target point as described above. Several measurements may be performed simultaneously or near simultaneously to generate a point cloud representing the state of the environment at a given moment. Each instance of the point cloud may be referred to as a frame. The LIDAR system may be capable of generating several frames of data per second.

The quality of the measurements will depend in part on the signal to noise ratio (SNR) of the measured signals, which may be affected by a number of factors. In accordance with embodiments, an amplitude modulation technique is used to improve the SNR by increasing the amplitude of at least one of the optical beams at least part of the time.

The SOA 314 may be configured to operate in the saturation mode well beyond the linear regime such that the gain is fixed. In this mode, the total optical power output by the SOA 314 stays fixed. Accordingly, any reduction in the amplitude of one optical beam will result in an increased amplification of the other optical beam. For example, if the optical beams have an equal amplitude and one of the optical beams is turned off, the amplitude of the other optical beam will approximately double (3 dB increase) compared to when both optical beams are on. Accordingly, both of the optical beams output by the SOA 314 may be amplitude modulated by controlling the amplitude of one of the optical beams input to the SOA 314. Note that the amplitude modulation of the optical beams is in addition to the frequency modulation (i.e., chirps) generated by the optical sources.

The amplitude modulation enables one of the optical beams to have a higher amplitude for some of the measurements. For example, in some embodiments, the amplitude modulation may be configured to cause the amplitude of one optical beam to have a higher amplitude for alternating frames. Increasing the amplitude for some frames means that the SNR will be lower for those frames, resulting in more accurate range calculations. However, the SNR will increase for the optical beam with the reduced amplitude, meaning that the velocity information, may be less accurate or not available. In some embodiments, the velocity information for a previous frame may be used in a current frame to make up for the lack of velocity information for the current frame.

There may be many situations in which it is beneficial for the LIDAR system to change the amplitude modulation scheme depending on operating conditions. Embodiments of the LIDAR systems described herein can change the amplitude modulation scheme during operation to adapt to changing conditions, such as changes in the vehicle operation (speed, direction, etc.) and changes in the environment. For example, the amplitude modulation may be turned on if the SNR of the return optical beam falls below a specified threshold and turned on if the SNR increases above a specified threshold.

Embodiments of the present techniques include various methods of controlling the amplitude modulation. For example, the amplitude of each optical beam input to the SOA 314 may be controlled by controlling the output of each respective optical source 304*a* 304*b* or by controlling the attenuation applied by each respective VOA 310*a* 310*b*. In some embodiments in which the amplitude modulation is implemented through the optical sources 304*a* 304*b*, the system may not include the VOAs 310*a* or 310*b*. Additionally, in some embodiments in which the amplitude modulation is implemented through the one of the VOAs 310*a* or 310*b*, the system may include a single VOA, either VOA 310*a* or VOA 310*b*.

Figure 5:
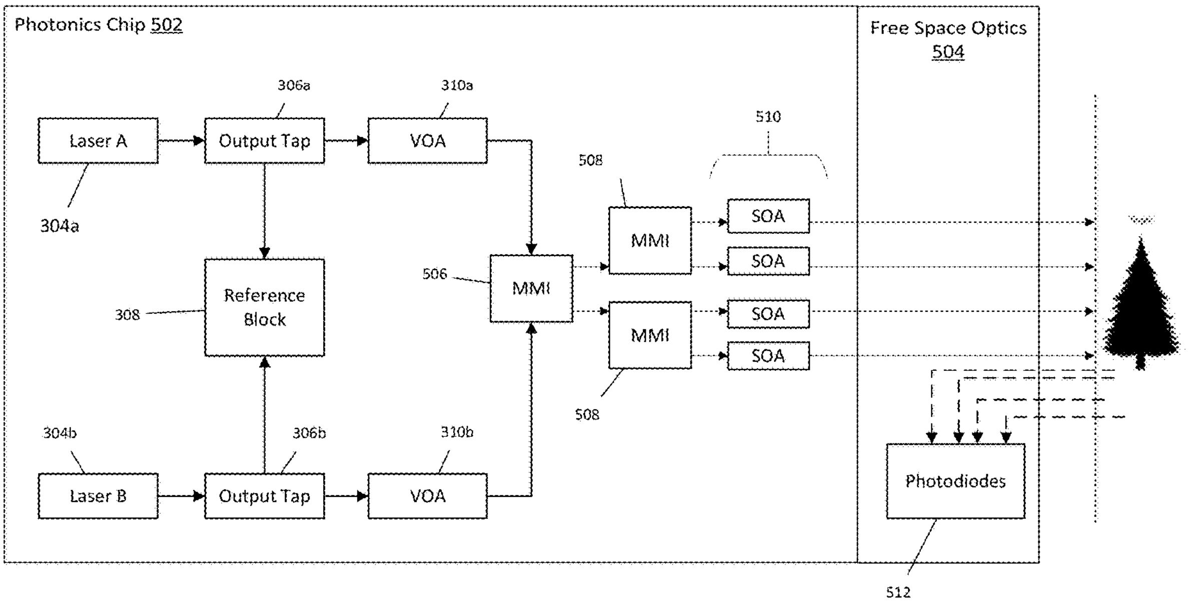
FIG. 5 is block diagram of another LIDAR system in accordance with some embodiments of the present disclosure.
Figure 6:
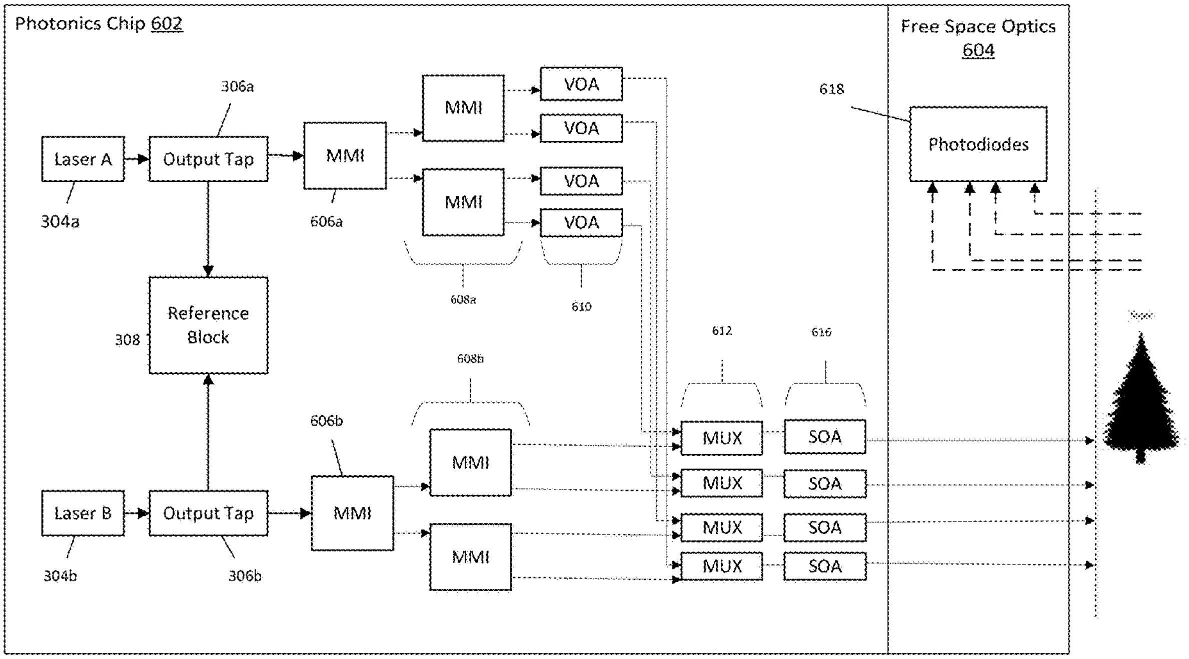
FIG. 6 is block diagram of another LIDAR system in accordance with some embodiments of the present disclosure.

It will be appreciated that a variety of alterations may be made to the depicted system without deviating from the scope of the claims. For example, the embodiment shown in FIG. 3 is configured to project a single combined optical beam which combines the optical beam from optical source A 304*a* and optical source B 304*b*. However, other embodiments may include additional optical sources. Additionally, the optical beams may be routed to form more than one combined optical beam, each of which may cover a different FOV. Additional LIDAR system embodiments are shown in FIGS. 5 and 6.

Figure 4:
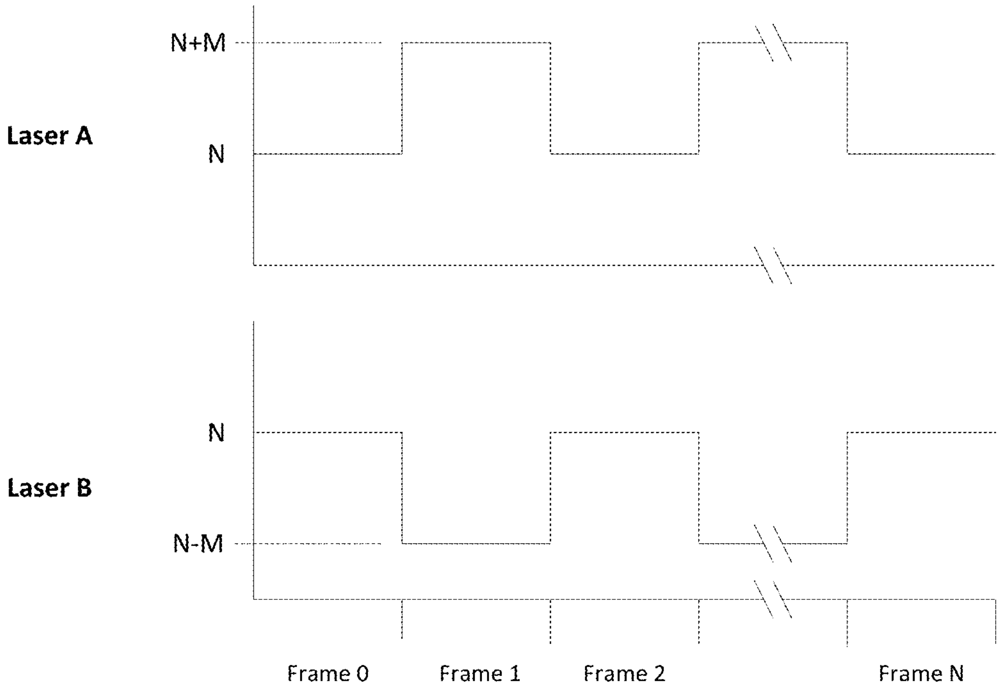
FIG. 4 is a diagram depicting a modulation algorithm for a LIDAR system in accordance with some embodiments of the present disclosure.

FIG. 4 is a diagram 400 depicting a modulation algorithm for a LIDAR system in accordance with some embodiments of the present disclosure. Specifically, FIG. 4 shows the amplitude of the output optical beam generated by an optical amplifier (e.g., SOA 314) over time for a pair of channels, referred to as Laser A and Laser B. Laser A may represent the transmitted optical beam generated by the optical source 304*a* and Laser B may represent the transmitted optical beam generated by the optical source 304*b*. As mentioned above, Laser A and Laser B form a combined beam which is emitted by the LIDAR system (e.g., LIDAR system 300) into the field of view. Laser A and Laser B may have different center frequencies or the same center frequency. It will be appreciated that the lasers are also frequency modulated to generate the chirps, which are not depicted in FIG. 4.

In FIG. 4, the Y-axis represents the amplitude of the optical beam and the X-axis represents time, which is divided into separate frames. In the embodiment shown in FIG. 4, the amplitude of each optical beam is modified for alternating frames. At frame 0, both optical beams are at amplitude N. At frame 1, laser B is reduced to N-M and Laser A increases to N+M. In other words, the resulting power reduction in the first output optical beam causes a corresponding power increase in the second output optical beam.

The values N and M may be any suitable power levels suitable of LIDAR systems. In some embodiments, N and M may be equal or approximately equal. In other words, during Frame 1, the optical beam amplitude of laser B may be reduced to zero or near zero. For example, the optical source 304*b* may be turned off or the VOA 310*b* may be made fully or nearly fully opaque. In such embodiments, the amplitude of the optical beam of laser A will double or nearly double (3 dB increase). Other embodiments are also possible. For example, the optical beam amplitude of laser B may be reduced to 50 percent, in which case, the optical beam amplitude of laser B will increase to approximately 150 percent.

During frame 0, the LIDAR system can be configured to measure the range and velocity of the target using the first beat frequency corresponding with Laser A and the second beat frequency corresponding with Laser B. During frame 1, the LIDAR system can be configured to measure the range of the target from the first beat frequency but not the velocity of the target. The velocity information for frame 1 may be copied to frame 0 so that, for each point, the velocity of the target determined for frame 0 is coupled to the range of the target which was determined for frame 1.

Although the amplitude of each optical beam is modified for alternating frames, other amplitude variation schemes may be implemented to achieve a different amplitude modulation frequency or duty cycle. For example, the amplitude of each optical beam can be modified after every second frame or third frame.

In some examples, the amplitude modulation may be activated based on measured data. For example, the amplitude modulation may be activated in response to an increase in the measured SNR of the return optical beams, the measured velocity of objects detected in the field of view, etc.

FIG. 5 is block diagram of another LIDAR system in accordance with some embodiments of the present disclosure. The LIDAR system 500 of FIG. 5 is similar to the LIDAR system described in relation to FIG. 3. However, the combined optical beam is split into four combined optical beams with the same or similar optical characteristics. The output of the VOAs 310*a* and 310*b* are input to the MMI 506, which combines the optical beam from optical source A 304*a* and optical source B 304*b* and then splits the combined optical beam equally between two outputs of the MMI 506. Each output is then input to one of two additional MMIs 508 and split again, resulting in four combined optical beams being amplified by respective SOAs 510. Each output optical beam is referred to as a combined beam because it combines the output of source A 304*a* with the output of optical source B 304*b*. Each combined optical beam is amplified by the respective SOA 510 and output to the free space optics 504. The free space optics 504 may guide each optical beam separately to increase the image resolution. Each of the combined optical beams may be amplitude modulated as described above in relation to FIGS. 3 and 4.

It will be appreciated that a variety of alterations may be made to the depicted system without deviating from the scope of the claims. For example, the combined optical beam may be split into any suitable number of output optical beams depending on the design considerations of a particular implementation.

FIG. 6 is block diagram of another LIDAR system in accordance with some embodiments of the present disclosure. There may be many situations in which it is beneficial for the LIDAR system to have different amplitude modulation schemes for different areas of the surrounding environment. The embodiment shown in FIG. 6 includes four output optical beams, each of which may be amplitude modulated separately.

As in FIG. 5, the system 600 includes a photonics chip 302 that include optical source A 304*a*, optical source B 304*b*, and the reference block 308. Each optical source 304*a* and 304*b* outputs a frequency modulated optical beam as described above. The center frequency of each optical beam may be the same as described in relation FIG. 2A or may be different as described in relation FIGS. 2B and 3C.

However, rather than combining the optical beam A with optical beam B and then splitting them into four separate combined optical beams as shown in FIG. 5, optical beams A and optical beam B are split separately into four beams each before combining them into four combined beams. Specifically, optical beam A is input to MMI 606*a* which is configured as a splitter to split the beam into two equal amplitude optical beams. Each of these beams is input to one of a pair of additional MMIs 608*a*, which splits each beam into two equal amplitude optical beams, resulting on four equal amplitude optical beams (four A optical beams). Similarly, optical beam B is input to MMI 606*b* which splits the beam into two equal amplitude optical beams. Each of these beams is input to one of a pair of additional MMIs 608*b*, which splits each beam into two equal amplitude optical beams, resulting on four equal amplitude optical beams (four B optical beams).

Each of the four A optical beams is input to one of four separate VOAs 610, which are configured to amplitude modulate each A optical beam separately. Each of the four A optical beams and four B optical beams are then combined by a set of four multiplexers 612 to generate four combined optical beams. Each of the four combined optical beams is amplified by a respective one of four SOAs 616 and output to the free space optics 504. The free space optics may guide each optical beam separately to increase the image resolution.

With the configuration shown in FIG. 6, each of the four combined optical beams may be amplitude modulated separately. For example, one, two, or three of the combined optical beams can be amplitude modulated, while the remaining beam(s) are not amplitude modulated. Additionally, all of the combined optical beams can be amplitude modulated or none of the combined optical beams can be modulated. Each amplitude modulated beam may be modulated differently by the respective VOAs 610 using, for example, a different degree of attenuation, a different frequency, or different duty cycle.

The amplitude modulation scheme may be changed during operation of the LIDAR system to adapt to changing conditions, such as changes in the vehicle operation (speed, direction, etc.) and changes in the environment. For example, each transmitted optical beam may be directed by the scanning optics to a different area within the field of view of the LIDAR system. Accordingly, each of the return optical beams may experience a different SNR depending on the objects within the respective area. In some embodiments, each transmitted optical beam may be controlled separately to turn on amplitude modulation if the SNR for the respective return optical beam falls below a specified threshold and turned off if the SNR for the respective return optical beam increases above a specified threshold.

It will be appreciated that a variety of alterations may be made to the depicted system without deviating from the scope of the claims. For example, the optical beams may be split and combined in a variety of ways to achieve separate amplitude modulation schemes for each of the combined optical beams depending on the design considerations of a particular implementation.

Figure 7:
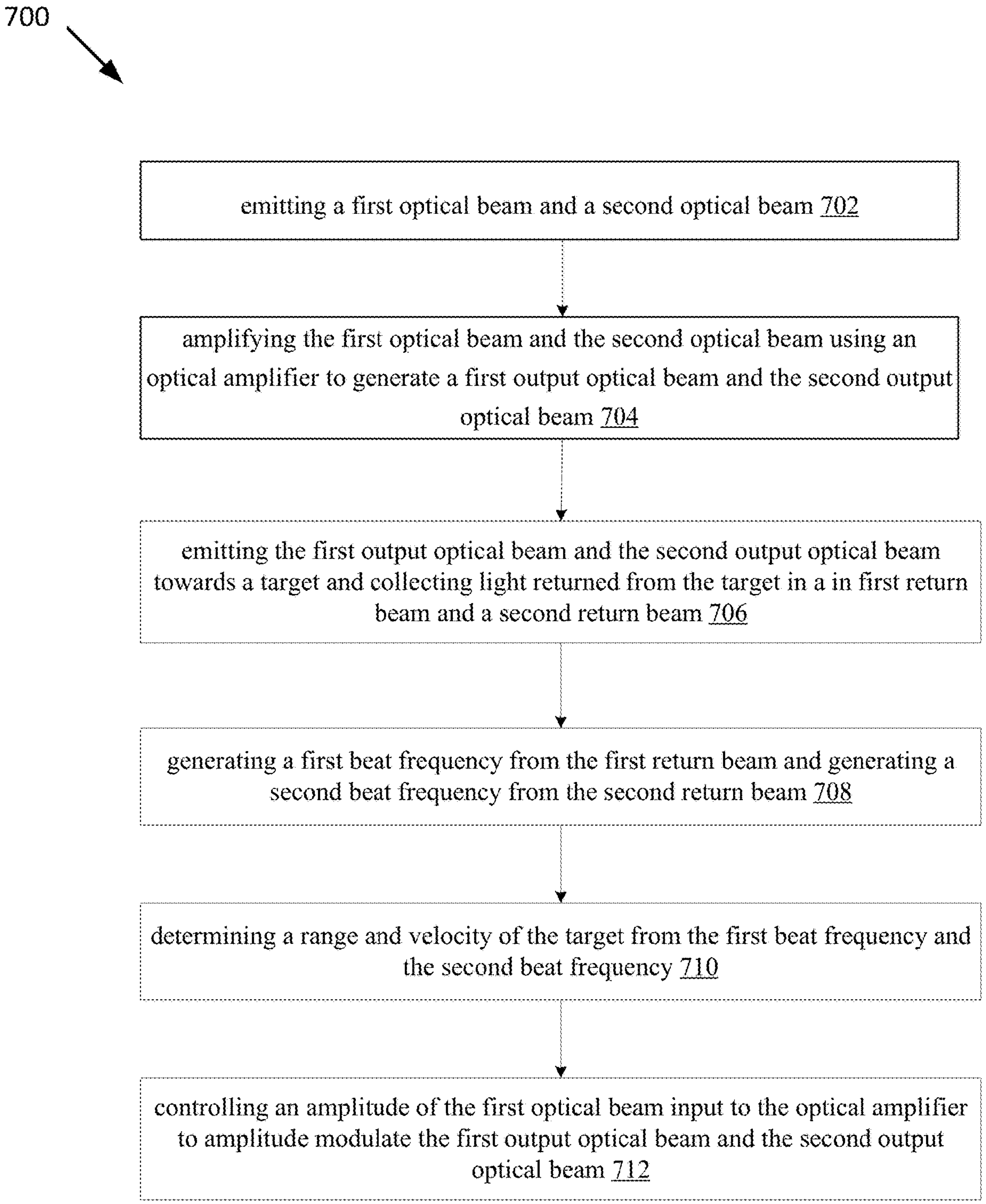
FIG. 7 is a process flow diagram of a method of using amplitude modulation to measure range and velocity of an object in accordance with some embodiments of the present disclosure.

FIG. 7 is a process flow diagram of a method of using amplitude modulation to measure range and velocity of an object in accordance with some embodiments of the present disclosure. The method 700 may be performed by any suitable LIDAR system, including the LIDAR systems described above in relation to FIGS. 3, 5, and 6. The method may begin at block 702.

At block 702, a first optical beam and a second optical beam are emitted. The optical beams may be emitted by an optical source (e.g. optical laser). Each optical beam may be frequency modulated, such that one optical beam forms an up chirp while the other optical beam simultaneously forms a down chirp. The optical beams may have different center frequencies, or the optical beams may have the same center frequency but different polarization. The first optical beam and a second optical beam are also combined to form a combined optical beam, according to one of the embodiments described above.

At block 704, the first optical beam and the second optical beam are amplified using an optical amplifier to generate a first output optical beam and a second output optical beam. The optical beams may be amplified after being combined into a combined optical beam so that both optical beams are amplified by the same optical amplifier.

At block 706, the first output optical beam and the second output optical beam are emitted towards a target and light returned from the target is collected in a first return beam and a second return beam. The optical beams may be emitted into the field of view of the LIDAR system by any suitable arrangement of optical elements included, for example, in the free space optics 320 shown in FIGS. 3, 5 and 6. The free space optics can also include an optical element for generating a local oscillator.

At block 708, a first beat frequency is generated from the first return beam and a second beat frequency is generated from the second return beam. The beat frequencies are generated by combining the return beams with a local oscillator and can be detected by a photodiode such as one of the photodiodes 316 shown in FIGS. 3, 5, and 6.

At block 710, a range and velocity of the target is determined from the first beat frequency and the second beat frequency. The range and velocity may be computed by a processor such as the signal processing unit 112 (FIG. 1) shown in FIGS. 2A, B, and C.

At block 712, the amplitude of the first optical beam input to the optical amplifier is controlled to amplitude modulate the first output optical beam and the second output optical beam. As described above, controlling the amplitude modulation of one of the optical beams serves to amplitude modulate both optical beams. The amplitude modulation may include reducing the amplitude of the first optical beams to a lower level (75, 50, 25 percent, for example) or turning off the first optical beam. The power reduction in the first output optical beam causes a corresponding increase in the second output optical beam. For example, if the first optical beam is turned off, the power in the second output optical beam will approximately double.

Controlling the amplitude of the first optical beam may be performed by controlling the optical source that generates the optical beam or by controlling an optical attenuator situated in the optical path between the optical source and the optical amplifier. In some embodiments, the optical attenuator is one of the VOAs 310*a*, 310*b*, or 610 described in relation to FIGS. 3, 5, and 6.

The amplitude modulation may cause the output optical beams to have varying amplitudes for different image frames. For frames in which the first optical beam is reduced or turned off, the signal processor may compute a range but not a velocity. For such frames, the velocity of a previous frame may be substituted. For example, in a first frame, the range and velocity of the target may be computed from the first beat frequency and the second beat frequency, while in a second frame the range of the target is computed from the second beat frequency and the velocity of the target determined from the first frame is coupled to the range of the target determined for the second frame to form a complete range and velocity pair. It should be noted that the first frame and second frame may be adjacent frames but are not necessarily adjacent frames.

It will be appreciated that embodiments of the method 700 may include additional blocks not shown in FIG. 7 and that some of the blocks shown in FIG. 7 may be omitted. Additionally, the processes associated with blocks 702 through 712 may be performed in a different order than what is shown in FIG. 7. Furthermore, it will be appreciated that although the above method refers to a single combined optical beam, the LIDAR system may also generate and emit an additional number of combined optical beams, which may also be amplitude modulated in any of the manners described above with relation to FIGS. 5 and 6.

The preceding description sets forth numerous specific details such as examples of specific systems, components, methods, and so forth, to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system comprising:

a first optical source and a second optical source configured to emit respectively a first optical beam and a second optical beam, wherein the first optical beam and the second optical beam are frequency modulated;

an optical amplifier to receive the first optical beam and the second optical beam and generate a first output optical beam and a second output optical beam;

an optical arrangement configured to emit the first output optical beam and the second output optical beam towards a target and collect light returned from the target in a first return beam and a second return beam;

an optical element to generate a first beat frequency from the first return beam and to generate a second beat frequency from the second return beam;

a signal processing system to determine a range and velocity of the target from the first beat frequency and the second beat frequency; and circuitry to control an amplitude of the first optical beam input to the optical amplifier to amplitude modulate the first output optical beam and the second output optical beam, wherein a reduction of the amplitude of the first optical beam input causes a resulting power reduction in the first output optical beam, and causes a corresponding power increase in the second output optical beam.

2. The LIDAR system of claim 1, wherein to control the amplitude of the first optical beam comprises to turn off the first optical beam to cause a doubling of power in the second output optical beam.

3. The LIDAR system of claim 1, wherein to control the amplitude of the first optical beam comprises to control a power output by first optical source.

4. The LIDAR system of claim 1, wherein to control the amplitude of the first optical beam comprises to control an attenuation of the first optical beam.

5. The LIDAR system of claim 1, wherein the signal processing system is to:

determine, for a first frame, the range and velocity of the target from the first beat frequency and the second beat frequency; and determine, for a second frame, the range of the target from the second beat frequency but not the velocity of the target.

6. The LIDAR system of claim 5, wherein the signal processing system couples the velocity of the target determined from the first frame to the range of the target determined for the second frame.

7. The LIDAR system of claim 1, wherein the optical amplifier is a first optical amplifier, the LIDAR system comprising:

an optical combiner configured to combine the first optical beam and the second optical beam into a combined beam input to the optical amplifier;

circuitry to split the first optical beam and the second optical beam to generate a third optical beam and fourth optical beam;

circuitry to combine the third optical beam and the fourth optical beam to generate a second combined beam;

at least a second optical amplifier to receive the second combined beam and generate a third optical output beam and a fourth optical output beam; and circuitry to control an amplitude of the third optical beam input to the second optical amplifier to amplitude modulate the third output optical beam and the fourth output optical beam separately from the first output optical beam and the second output optical beam.

8. A method of operating a frequency modulated continuous wave (FMCW) light detection and ranging (LIDAR) system comprising:

emitting a first optical beam and a second optical beam, wherein the first optical beam and the second optical beam are frequency modulated;

amplifying the first optical beam and the second optical beam using an optical amplifier to generate a first output optical beam and a second output optical beam;

emitting the first output optical beam and the second output optical beam towards a target and collecting light returned from the target in a first return beam and a second return beam;

generating a first beat frequency from the first return beam and generating a second beat frequency from the second return beam;

determining a range and velocity of the target from the first beat frequency and the second beat frequency; and controlling an amplitude of the first optical beam input to the optical amplifier to amplitude modulate the first output optical beam and the second output optical beam, wherein a reduction of the amplitude of the first optical beam input causes a resulting power reduction in the first output optical beam, and causes a corresponding power increase in the second output optical beam.

9. The method of claim 8, wherein controlling the amplitude of the first optical beam comprises to turning off the first optical beam to cause a doubling of power in the second output optical beam.

10. The method of claim 8, wherein controlling the amplitude of the first optical beam comprises controlling a power output by first optical source or controlling an attenuation of the first optical beam.

11. The method of claim 8, comprising:

determining, for a first frame, the range and velocity of the target from the first beat frequency and the second beat frequency; and determining, for a second frame, the range of the target from the second beat frequency but not the velocity of the target.

12. The method of claim 11, comprising coupling the velocity of the target determined from the first frame to the range of the target determined for the second frame.

13. A frequency modulated continuous wave (FMCW) light detection and ranging (LIDAR) system, comprising:

a processing device; and a memory to store instructions that, when executed by the processing device, cause the LIDAR system to:

emit a first optical beam and a second optical beam, wherein the first optical beam and the second optical beam are frequency modulated;

amplify the first optical beam and the second optical beam using an optical amplifier to generate a first output optical beam and a second output optical beam, wherein the first output optical beam and the second output optical beam are emitted towards a target, and wherein light returned from the target is collected in a first return beam and a second return beam to generate a first beat frequency from the first return beam and generate a second beat frequency from the second return beam;

determine a range and velocity of the target from the first beat frequency and the second beat frequency; and control an amplitude of the first optical beam input to the optical amplifier to amplitude modulate the first output optical beam and the second output optical beam, wherein a reduction of the amplitude of the first optical beam input causes a resulting power reduction in the first output optical beam, and causes a corresponding power increase in the second output optical beam.

14. The LIDAR system of claim 13, wherein to control the amplitude of the first optical beam the processing device is to cause the LIDAR system to control a power output by first optical source.

15. The LIDAR system of claim 13, wherein to control the amplitude of the first optical beam the processing device is to cause the LIDAR system to control an attenuation of the first optical beam.

16. The LIDAR system of claim 13, wherein the processing device is to cause the LIDAR system to determine, for a first frame, the range and velocity of the target from the first beat frequency and the second beat frequency; and determine, for a second frame, the range of the target from the second beat frequency but not the velocity of the target.

17. The LIDAR system of claim 16, wherein the processing device is to cause the LIDAR system to couple the velocity of the target determined from the first frame to the range of the target determined for the second frame.

* * * * *